United States Patent

Sheridan et al.

[11] 3,892,869
[45] July 1, 1975

[54] END PLUG CLOSURES FOR SHIRRED CASING STICKS AND METHODS FOR MAKING THEM

[75] Inventors: Arthur L. Sheridan, Woodridge; Walter V. Marbach, Palos Heights, both of Ill.

[73] Assignee: Union Carbide Corporation, New York, N.Y.

[22] Filed: Mar. 27, 1974

[21] Appl. No.: 455,367

[52] U.S. Cl. ............ 426/138; 426/135; 426/140; 426/390; 17/49; 138/118.1; 150/42; 150/44
[51] Int. Cl. ............................................ A22c 13/00
[58] Field of Search .......... 426/105, 135, 140, 138, 426/390; 17/34, 42, 49; 138/118.1; 150/42, 44

[56] References Cited
UNITED STATES PATENTS

| 3,274,005 | 9/1966 | Alsys | 426/140 |
| 3,383,222 | 5/1968 | Alsys et al. | 17/49 X |

*Primary Examiner*—Hyman Lord
*Attorney, Agent, or Firm*—C. F. O'Brien

[57] ABSTRACT

Improved end closures for shirred casing sticks and methods for making them which comprise inturning a predetermined amount of a casing material into a forming tube and then compressing the inturned casing material against a fixed surface to form a free floating, semi-floating or fully anchored type flat end plug which when anchored within the fore end of a shirred stick may or may not form an integral part thereof.

5 Claims, 18 Drawing Figures

PATENTED JUL 1 1975　　3,892,869

SHEET　1

END PLUG CLOSURES FOR SHIRRED CASING STICKS AND METHODS FOR MAKING THEM

FIELD OF THE INVENTION

This invention relates to improved end closures of casing material for hollow shirred casing sticks and to methods for making such end closures.

BACKGROUND OF THE INVENTION

Shirred food casings of flexible tubing are presently being used in the meat industry for making sausage products such as frankfurters, pork sausages or the like. The flexible tubing used for food casing may be comprised of proteins, carbohydrates and the like as collagens, alginates, starches or cellulosic material such as cellulose esters, cellulose ethers and regenerated cellulose, as well as other natural, synthetic or artificial materials. The casings are first prepared as hollow, thin-walled tubes of lengths ranging from about 12.2 to about 48.8 meters or more, and then shirred and compressed to produce what is commonly termed in the art "shirred casing sticks or strands" of from about 20 centimeters or less to about 69 centimeters or more in length.

The shirred casing sticks are then packaged and shipped to a food processor where each individual stick is stuffed with food emulsion filling the casing to its fully extended length. Such casing sticks may be stuffed with food emulsion by manual or automatic operations. In the manual operation, the casing stick is sheathed onto a thin-walled food stuffing horn connected to a conventional valve controlled vessel filled with food emulsion under pressure. The operator may deshirr a short length of casing at its outboard or fore end to form a closure thereat so as to prevent the loss of food emulsion during the filling of the casing.

Automatic machines have been developed for stuffing or stuffing and linking of shirred food casings with food emulsions to produce such products as frankfurters or the like on a continuous basis. One such automatic machine, disclosed in U.S. Pat. No. 3,115,668 to Townsend, is capable of successively stuffing and linking a shirred casing with food emulsion to produce a plurality of food links on a continuous basis. In automatic food stuffing machines of all types, and with the Townsend machine in particular, the stuffing of the casing usually takes place within several seconds with the result that the casing is extended from a shirred length of 20 to 69 centimeters to an extended length of 12.2 to 48.8 meters or more in a matter of 7 to 30 seconds. This rapid extension of the casing during the stuffing operation of the machine requires the casing to be especially strong and resistant to tearing. In addition, the casing stick is required to have an end closure so that the shirred casing stick can merely be placed on the stuffing horn of a stuffing machine and filled with food emulsion without further handling by the machine operator to ensure that none of the food emulsion escapes from the casing. In practice, a plurality of shirred casing sticks with the fore end of each plugged or otherwise closed, are placed in a dispensing hopper of an automatic stuffing-linking machine. The machine operates such that one stick at a time is fed from the hopper to clamping-aligning means that align the stick's bore with a thin-walled reciprocating food stuffing horn. The stuffing horn is retractable to a starting position aft of the casing stick positioned in the aligning means. The discharge end of the stuffing horn is advanced into the casing bore and must engage the fore end of the casing stick to initially deshirr and push the fore end about midway through an annular passage on a control chuck. Thereupon a pusher at the aft end of the stick advances to compress the casing and seat the fore end of the casing wall into flutes of the chuck's passage. Before the stuffinglinking operation begins, the casing's fore end is firmly seated into and gripped by flutes of the chuck. Food emulsion is then dispensed from the stuffing horn and the chuck is rotated to cooperate with linking means to thereby form the filled casing stick into links of predetermined length which can thereafter be suitably processed, if necessary, to produce a strand of sausage links or the like which, if peeled, yield skinless frankfurters or the like.

Consequently, stuffing-linking machinery that operates in such a manner requires shirred food casing sticks to have a plug or closure at the fore end of such sticks so that the advancing stuffing horn may engage it so that the stuffing horn can advance the casing stick into the chuck to thereby deshirr the casing without dissociation of the closure and also to effectively block the flow therethrough of food emulsion. The closure thus serves as an abutment to properly initiate suitable filling and deshirring of the casing stick while simultaneously providing suitable control for the start of the linking operation without having any of the food emulsion escape from the casing. When using completely hollow casing sticks with automatic stuffing-linking machinery, the operator had to plug one end of each casing by tying, twisting or inserting an obstruction to the food emulsion flow. This was a costly and time consuming operation for the food packer. Thus it became conventional practice to provide a casing stick with an end closure prepared during the manufacture of the casing rather than during the use of the casing at the site of the stuffing and linking operations. Consequently, various types of casing closures, and methods for forming the same, have been disclosed, as for example, in U.S. Pat. No. 3,162,893 to Townsend, U.S. Pat. No. 3,274,005 to Alsys, U.S. Pat. No. 3,383,222 to Alsys et al. and U.S. Pat. Nos. 3,419,401, 3,550,191, 3,564,647 and 3,570,045 to Matecki, and in U.S. application Ser. No. 242,932 to Turns et al.

Although these casing end closures exhibit many advantages over the manually formed closures, they have been found to have certain limitations such as not being readily formable on shirring machines, being difficult to control the amount of casing used in forming the end closure, being too tightly anchored in the bore, or being too rigid to be employed in some versions of the automatic linking means of stuffing machines.

Accordingly, it is one object of this invention to provide a new and improved method of closing the fore end of a shirred casing stick for food or other materials.

Another object of this invention is to provide an improved method for closing the end of a shirred casing stick utilizing only the material of the casing in the closure.

Another object of the invention is to provide a new and improved method of producing plug closures for hollow shirred sticks of tubular casings.

Another object of this invention is to provide a new and improved shirred food casing stick having a floating end closure which is integral with the casing stick.

Another object of this invention is to provide a new and improved shirred food casing stick having a semi-floating end closure which may or may not be integral with the casing stick.

Still another object of this invention is to provide a new and improved shirred food casing stick having a fully anchored plug closure to prevent improper sheathing of the stick onto a stuffing horn and to permit internal engagement of the closure with means to deshirr and stuff the casing with food emulsion.

Still another object of the invention is to provide a new and improved shirred casing stick with a plug closure which is not an integral part of the casing stick.

Other and additional objects of the invention will become apparent from the specifications, description and accompanying drawings.

SUMMARY OF THE INVENTION

The invention relates to a hollow shirred stick of tubular casing having an open end, also referred to as the aft end, and a closed end, also referred to as the fore end, said closed end comprising a plug of compressed deshirred casing of which a first portion is secured to at least a portion of the closed or fore end surface of the shirred stick with the remainder generally conforming to the bore of the shirred stick and extending within said bore so as to form an annular space between the extended portion of said plug and the internal wall of the shirred stick. Another embodiment of a closed end for a hollow shirred stick of tubular casing comprises a cylindrical plug of compressed deshirred casing, having substantially flat end surfaces, coaxially implanted within the bore of the shirred stick and substantially flush mounted at the closed or fore end thereof. The plug in both of these embodiments could preferably be an integral part of the casing so as to efficiently and easily allow the fore end pleats of the casing to be initially deshirred by the advancement of a stuffing horn of an automatic stuffing machine for inserting the fore end of the casing into a chuck member of the machine whereupon the pressure of the dispensing food or other type emulsion could then deshirr the remainder of the casing. In another embodiment, a plug can be prepared using casing or some other material in a separate operation and then be inserted into the bore at the fore end of a shirred casing stick having a deshirred portion of about 2 to 5 centimeters. The separately produced plug can be attached or otherwise secured to the deshirred casing at the fore end of the stick prior to being inserted in the bore of the casing or subsequent thereto as long as it is sufficiently anchored to the fore end of the casing stick to allow for the fore end to be initially deshirred as stated above. Preferably, the portion of the separately produced plug which extends substantially across the bore of the casing stick should be compressed against the internal wall of the casing stick and then the deshirred portion of casing stick folded tightly into or bonded onto the end surface of the plug to form a secured union therewith.

In both the integral and non-integral plug embodiments, the plug should be sufficiently anchored to the fore end of the casing stick so as to permit initial deshirring as stated above and to prevent blowout of the plug ring during filling of the casing with food or other type emulsion while being adaptable so that any excess emulsion that may be trapped in the first link of the casing can be easily removed.

The invention also relates to a method for closing an end of a hollow shirred stick of tubular casing which comprises:
 a. placing a hollow cylindrical forming tube into the bore of a hollow shirred stick of tubular casing;
 b. inturning a portion of the casing at the fore end of the shirred stick into said forming tube;
 c. placing a relatively fixed surface against the end of the shirred stick containing the inturned casing;
 d. compressing the inturned casing against said fixed surface to form a compressed plug of casing within the bore of the shirred stick; and
 e. removing said forming tube from the bore of said shirred stick.

Another method for closing an end of a hollow shirred stick of tubular food casing would comprise steps (a) through (c) above followed by the following step:
 d'. compressing the inturned casing against said fixed surface while simultaneously removing said forming tube so as to form a compressed flat-end-face cylindrical plug of casing within the bore of said shirred stick which is tightly compressed against the internal wall of said shirred stick with sufficient tenacity to allow the fore end of the casing to be forcibly inserted into sizing-linking means of an automatic stuffing machine.

Another feature of this invention relates to a method for producing plugs or closures of compressed casing, made of food casing or another type material, for use with hollow shirred sticks of tubular casings which comprises:
 a. implanting a fixed amount of casing into one end of a cylindrical forming tube;
 b. placing a relatively fixed surface against the end of the forming tube containing the implanted casing; and
 c. compressing the implanted casing against said fixed surface to form a compressed cylindrical plug of casing having substantially flat end surfaces.

The compressed plug can then be firmly anchored to the pleats of the internal wall of the fore end of a hollow shirred stick of tubular casing, for example, food casing, by being forcibly implanted therein so as to provide a suitable closure thereat as described above.

To produce a semi-floating non-integral plug for a hollow shirred stick, the forming tube in step (a) above is preferably coaxially aligned within a larger cylindrical support tube and recessed at one end by a fixed amount. A fixed amount of casing is then implanted into the recessed end of the forming tube and steps (b) and (c) are performed as stated above except that instead of producing a cylindrical compressed plug, a mushroom type semi-floating plug is produced. Thereafter the semi-floating plug can be forcibly inserted into the fore end of a hollow shirred stick with the top or larger diameter portion of the plug being firmly anchored to the pleats of the internal wall of said shirred casing.

As used herein, the terms "fore end" and "aft end" of the shirred casing stick are intended to mean the direction of shirring in the stick, the fore end being the part of the casing to be initially shirred, and the aft end being the last to be shirred. Thus, it is the aft end of the shirred casing stick that is fed over a stuffing horn so that the food emulsion dispersed from said horn will deshirr and fill the fore end of the casing stick first. Typical methods and apparatus employed to shirr lengths of tubular casing to obtain shirred casing sticks are disclosed, for example, in U.S. Pat. Nos. 2,983,949 and 2,984,574 to Matecki and U.S. Pat. No. 3,110,058 to Marbach.

It should be appreciated that the size, shape and degree of anchoring of the compressed plugs of this invention can vary depending on the size and use of the hollow shirred casing sticks with which it will be used. For example, with casing sticks having an internal or bore diameter of between about 9 to 25 mm., the cylindrical flat-end plugs of this invention can vary in casing deshirred lengths between about 7 cm. to about 46 cm. in length and have a diameter sufficient so that the plug can be firmly anchored within the fore end of the casing stick. A plug having a deshirred casing length smaller than about 7 cm. would be undesirable because: (1) the plug would not contain enough material to permit a stuffing horn of an automatic stuffing machine to advance the stick containing said plug into a chuck of the machine for proper indexing therein; and (2) the plug would not contain enough material in which to maintain integrity or securement to the stick and this could result in blowouts and/or leakage during stuffing of the stick. A plug length larger than about 46 cm. would be undesirable because: (1) the plug would have too much material and thereby be too large and rigid to cooperate satisfactorily with the linking means of an automatic stuffing machine; (2) too much material in the plug prevents effective and efficient stripping of emulsion from the first (partially filled) link; (3) leads to ineffective and wasteful use of casing material; and (4) causes the plug to be anchored more securely to the bore than desirable.

Preferably, a shirred cellulose casing stick having an outside diameter of about 23 mm., an inside diameter of about 13 mm. and a shirred length of about 50 cm. (a deshirred length of about 50 m.) can use floating plugs having a deshirred casing length of 25 cm. compressed to a plug length of about 25 mm. When using a semi-floating plug for the above sized casing, the preferred compressed casing length would be about 20 mm. and when using a fully anchored plug, the preferred compressed casing length would be about 15 mm.

The casing lengths of the compressed plugs of this invention can vary depending on the end use of the casing sticks in which they will be used. However, for general application use, preferable deshirred lengths of the plugs should be between about 20 cm. and about 36 cm.

The diameter of the smaller cylindrical portion of the floating plug can vary depending on the bore and end use of the shirred casing stick. The benefits of employing a floating end plug are that it permits ease and uniformity of deshirring the fore end of the stick in which it is used while it also provides a softer or more resilient plug for minimizing difficulties with the linking means of automatic stuffing machines.

The size and shape of the semi-floating plugs of this invention can vary whereby the length and diameter of the floating segment can be as described above for the floating end plug while the length and diameter of the anchored portion can be as described above for the flat end cylindrical plug.

A common feature of all the above shaped plugs is that each is provided with a flat end facing the aft end of the casing stick thereby providing a more reliable pressure receipt point for the fore end of the food emulsion stuffing horn of commercial stuffing machines such as disclosed in the above-identified patent to Townsend. This is an important feature since at the start of the stuffing cycle, the stuffing horn is advanced through the bore of an indexed casing to engage the plug positioned at the casing's fore end to introduce it into a rotating annulus or chuck on the machine which cooperates with linking means for automatically linking the stuffed casing into predetermined lengths after it is filled with food emulsion. The plugs of this invention, in addition to having the necessary mechanical integrity to withstand the initial insertion of the casing into the chuck member, possess the necessary hydraulic integrity to prevent ejection of the food emulsion during the stuffing operation while also being susceptible to being stripped upon completion of the stuffing and linking operation so that any food emulsion contained therein can be salvaged.

Illustrative embodiments of the invention are shown in the drawings wherein.

Referring in detail to FIGS. 1 through 9 there is shown a hollow stick of tubular food casing 10 having a deshirred first length 12 at the fore end thereof. A forming or pack sleeve 14 is shown disposed within the bore of casing stick 10 substantially flush mounted to the fore end of casing stick 10. A reciprocating pack rod 16 (reciprocating means not shown), secured to support member 18, is positioned within the bore of sleeve 14 and is adapted to have a close slide fit therein. By substantially eliminating any clearance between pack rod 16 and the internal diameter of sleeve 14, wedging of casing material between pack rod 16 and sleeve 14 is effectively prevented during the compressing operation by these components as will be described below. Pack rod 16 is provided with a conduit 20 to effectively equalize the air pressure in the chamber formed within the bore of casing stick 10 as the pack rod 16 is advanced or retracted from said bore before or after compressing, respectively, the plug at the fore end of casing stick 10 against a fixed surface.

Figure 1:
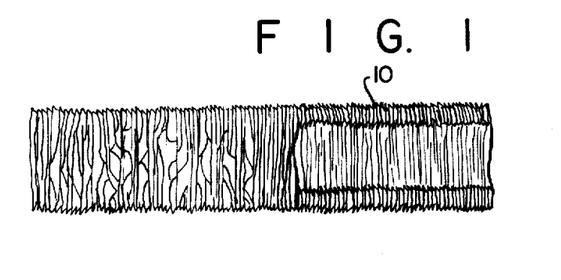
FIG. 1 is a view partially in elevation and partially in section of a hollow shirred stick of tubular food casing with a portion of the casing deshirred at its fore end.
Figure 2:
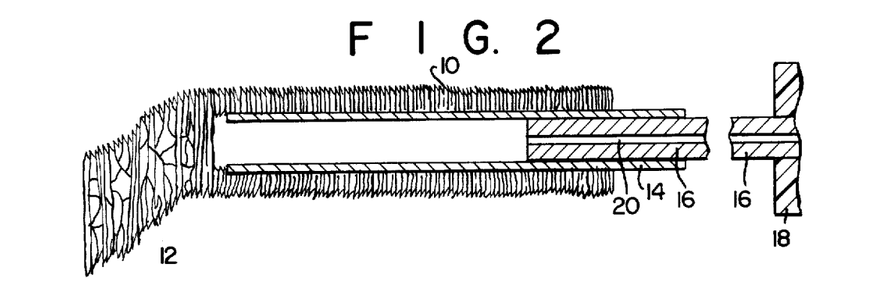
FIG. 2 is a view of the hollow shirred stick of FIG. 1 with a forming tube containing a packing rod disposed within the bore of the shirred stick.
Figure 3:
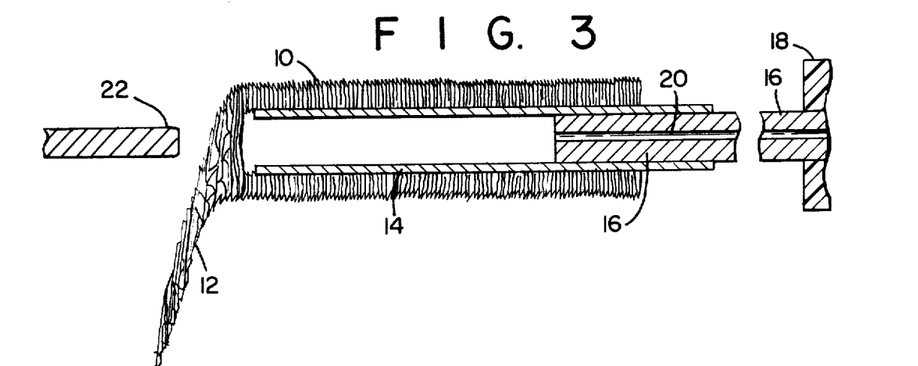
FIG. 3 is a view of the shirred stick assembly in FIG. 2 with an inverting rod positioned to initiate the inturning of the deshirred casing into the bore of the forming tube.
Figure 4:
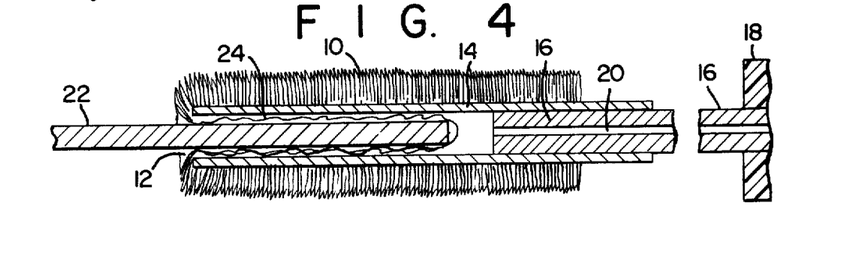
FIG. 4 is a view of the shirred stick assembly of FIG. 3 with the inverting rod moved to a position whereby the deshirred casing shown in FIG. 1 along with a second portion of deshirred casing is inturned into the bore of the forming tube.

With the deshirred length 12 of casing stick 10 positioned to occlude or obstruct the bore at the fore end of casing stick 10 as shown in FIG. 3, an inverting rod 22, axially aligned with forming sleeve 14, is advanced into said sleeve 14 a predetermined distance short of contact with pack rod 16. During the insertion of inverting rod 22, deshirred length 12 and a second deshirred length 24 which is concurrently deshirred by the advancing inverting rod 22, are inturned into sleeve 14 as shown in FIG. 4. The amount of each of these deshirred lengths 12 and 24 can vary depending upon the distance advanced by inverting rod 22 and the density and length of the closure plug desired.

Figure 5:
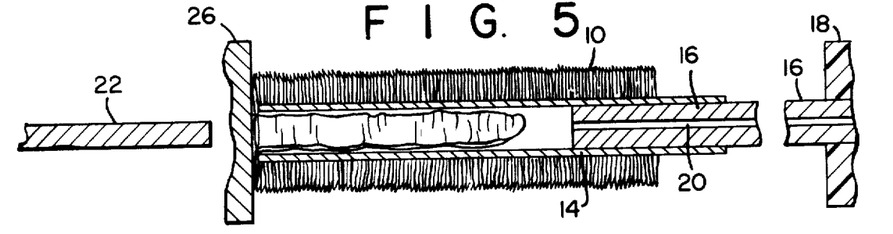
FIG. 5 is a view of the shirred stick assembly of FIG. 4 with the inverting rod removed and a fixed surface positioned against the fore end of the shirred stick.
Figure 6:
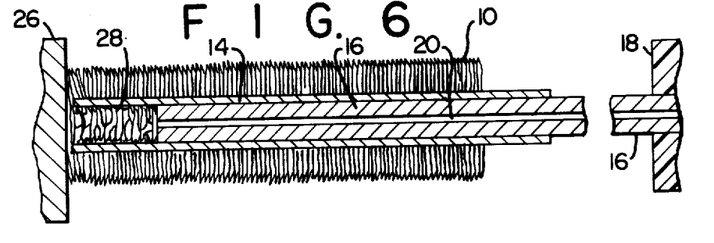
FIG. 6 is a view of the shirred stick assembly of FIG. 5 with the packing rod positioned such that the inturned casing is compressed against the fixed surface.

Upon removal of inverting rod 22, a relatively fixed surface 26 is placed against the fore end of casing stick 10 as shown in FIG. 5 and then pack rod 16 is advanced to compress and compact the inturned casing lengths 12 and 24 into a floating closure plug 28 as shown in FIG. 6. The close slide fit between pack rod 16 and the bore of sleeve 14 prevents the casing lengths 12 and 24 from being wedged between members 16 and 14 and thereby effectively allows pack rod 16 to impart a flat-end surface to the compressed plug 28.

Figure 7:
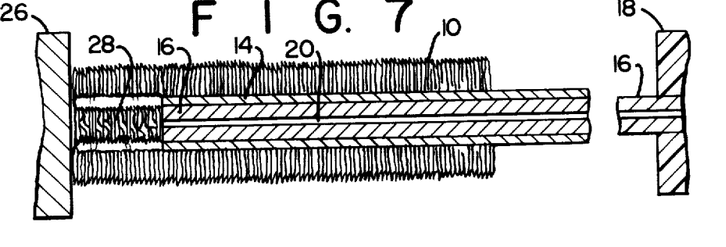
FIG. 7 is a view of the shirred stick assembly of FIG. 6 with the forming tube moved to a position of alignment with the packing rod.
Figure 8:
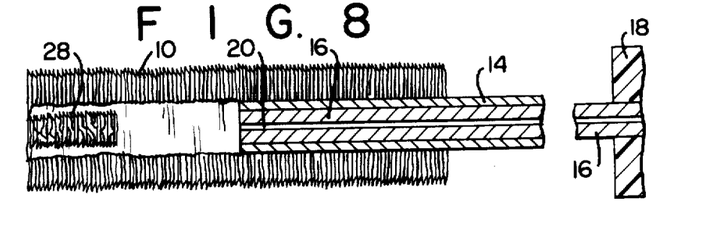
FIG. 8 is a view of the shirred stick assembly of FIG. 7 with the forming tube and packing rod being moved to the aft end of the shirred casing.

Forming sleeve 14 is then retracted from compressed plug 28 until aligned with pack rod 16 which remains engaged with said plug 28 as shown in FIG. 7. Thereafter pack rod 16 and forming sleeve 14 are concurrently withdrawn from the bore of casing stick 10 and fixed surface 26 is removed as shown in FIG. 8. Conduit 20 in pack rod 16 functions to equalize the air pressure formed in the chamber of the bore of casing 10 thus preventing the plug 28 from being drawn further into the bore by a vacuum which would normally be created in the chamber upon removal of pack rod 16 from casing stick 10. Once pack rod 16 and sleeve 14 are removed, a casing stick 10 remains having a floating end closure 28 at its fore end as shown in FIG. 9.

Figure 10:
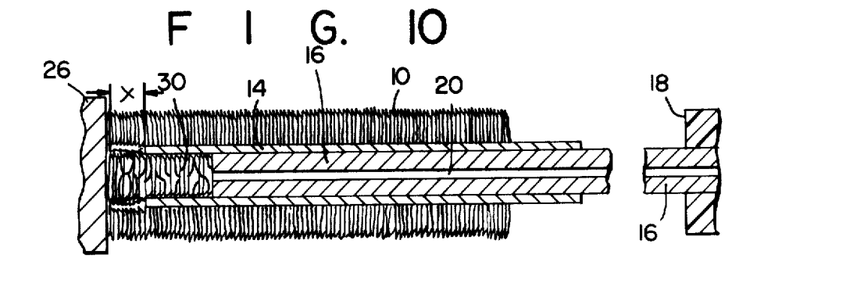
FIG. 10 is a view of a shirred stick assembly similar to FIG. 6 except that the forming tube is recessed at the fore end of the shirred stick.
Figure 11:
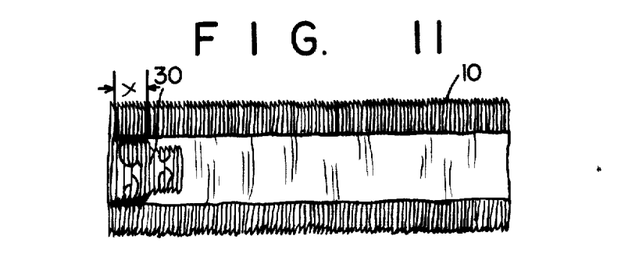
FIG. 11 is a view of the shirred stick of FIG. 10 after the semi-floating plug is formed and the forming tube and packing rod removed.

FIG. 10 shows an arrangement of components as in FIG. 6 which uses the same reference numbers for identical members. The only difference is that forming sleeve 14 is shown displaced a predetermined distance x from the fore end of casing stick 10 so that during compaction of the inturned casing lengths 12 and 24, a portion of plug 30 will be firmly anchored to the pleats comprising the bore of casing stick 10. The pack rod 16 and sleeve 14 are removed as discussed above leaving a casing stick 10 having a semi-floating end closure 30 at its fore end as shown in FIG. 11. As stated above, the distance x of semi-floating plug 30 can vary as long as it exhibits a sufficient degree of tenacity of anchoring to the internal wall of casing stick 10 to force the fore end of the casing stick into sizing-linking means of an automatic stuffing machine.

Figure 12:
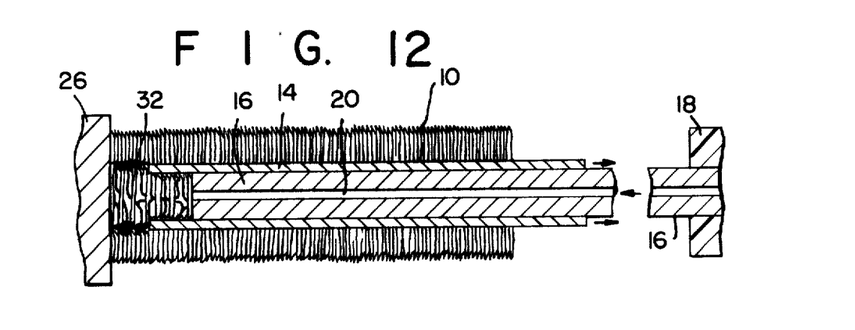
FIG. 12 is a view of a shirred stick assembly similar to FIG. 10 except that the forming tube is shown in a position of being removed as the packing rod is advancing to the fore end of the casing.
Figure 13:
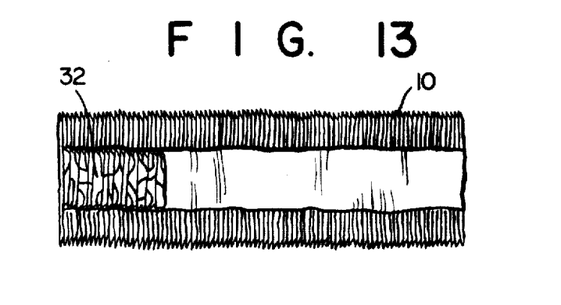
FIG. 13 is a view of the shirred stick of FIG. 12 after the fully anchored plug is formed and the forming tube and packing rod removed.

FIG. 12 shows an arrangment of components as in FIG. 10 which uses the same reference numbers for identical members. The only difference is that as pack rod 16 advances to compact casing lengths 12 and 24, forming sleeve 14 is concurrently retracted so that plug 32 is formed fully anchored to the fore end of casing stick 10. Upon removal of pack rod 16 and sleeve 14 after compaction of casing lengths 12 and 24, a casing stick 10 remains which has a fully anchored, flat-end-face cylindrical plug 32 at its fore end as shown in FIG. 13.

Figure 9:
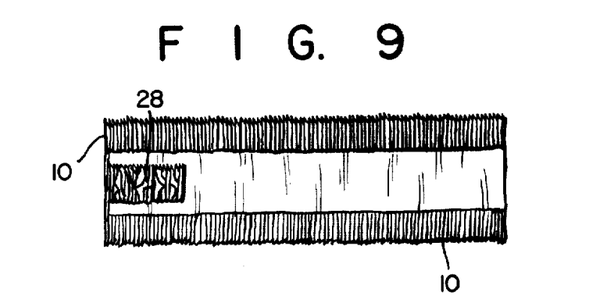
FIG. 9 is a view of the shirred stick of FIG. 8 after the floating plug is formed and the forming tube and packing rod removed.
Figure 18:
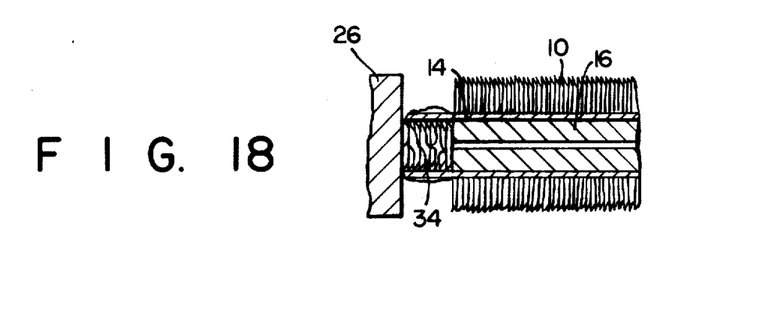
FIG. 18 is a view of a shirred stick assembly similar to FIG. 6 except that the forming tube is extended outside the fore end of the shirred casing.

It is also to be understood that the forming tube 14 could extend outside the fore end of casing 10 as shown in FIG. 18 so that a plug 34 could be formed outside casing 10 using pack rod 16 and then inserted into the bore of casing 10 to produce a closure as shown, for example, in FIG. 9.

Figures 14, 15:
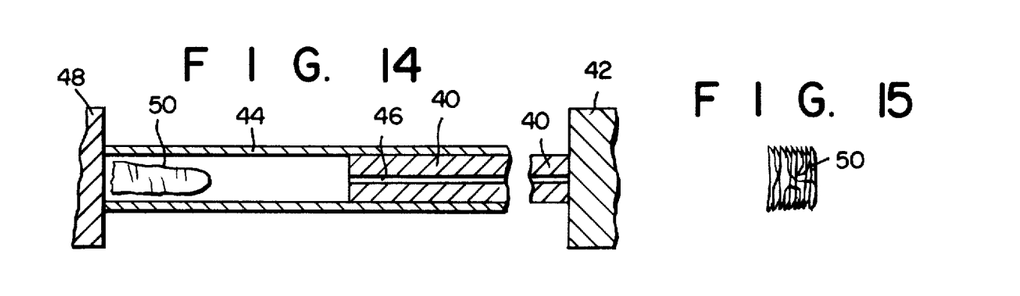
FIG. 14 is a view of a portion of severed deshirred casing implanted within a forming tube and showing a fixed surface and packing rod in position to initiate compression of the casing.
FIG. 15 is a view of a flat-end cylindrical plug formed using the assembly and material shown in FIG. 14.

Referring in detail to FIGS. 14 and 15, there is shown a reciprocating pack rod 40, secured to support member 42, positioned within the bore of a forming sleeve 44 and adapted to have a close slide fit within said bore for the reasons mentioned above. Pack rod 40 also has a conduit 46 for the reasons advanced above. A relatively fixed surface 48 is positioned against the end of the forming sleeve 44 once a predetermined amount of severed deshirred casing 50 is implanted within said end of sleeve 44. The deshirred casing 50 can be implanted in the bore of sleeve 44 in any convenient manner such as disclosed with reference to FIGS. 4 and 5 whereby an inverting rod is employed. Once casing 50 is disposed in sleeve 44, pack rod 40 is advanced to compact the casing 50 against fixed surface 48 thereby forming a cylindrical plug having flat end faces as shown in FIG. 15. This cylindrical plug can then be forced fit into the fore end of a casing stick so that it can become fully anchored therein as shown in FIG. 13.

Figures 16, 17:
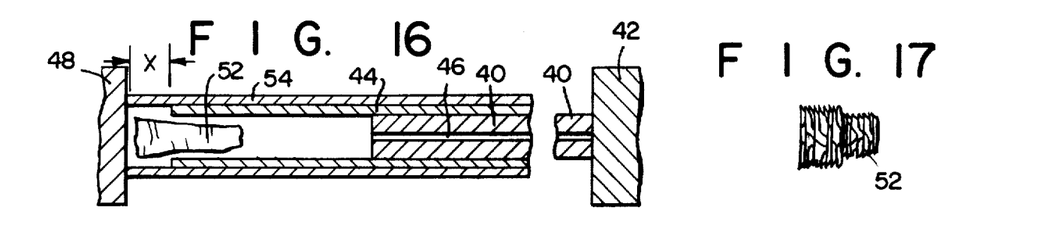
FIG. 16 is a view of a portion of severed deshirred casing implanted within a forming tube which is coaxially mounted within, and recessed from, one end of a supporting tub and showing a fixed surface and packing rod in position to initiate compression of the casing.
FIG. 17 is a view of a semi-floating plug formed using the assembly and material shown in FIG. 16.

To form a semi-floating plug as shown in FIG. 17, the components of FIG. 14 can be used with the addition of a support tube 54 coaxially mounted outside of forming sleeve 44 as shown in FIG. 16. Forming sleeve 44 also has to be recessed or spaced a predetermined distance x from the fixed surface 48 so that when pack rod 40 is advanced to compact casing 52, a portion of the plug so formed will be suitable for being forced fit into the fore end of a casing stick where it can be firmly anchored therein as shown in FIG. 11. All that is required is that the portion x anchored into the bore of a casing stick have a degree of tenacity of anchoring to the internal wall of the bore so as to allow the fore end of the casing stick to be forced into sizing-linking means of an automatic stuffing machine without damaging either the casing or the sizing-linking means.

When the plugs are fabricated in a separate operation as described in conjunction with FIGS. 14 to 17, they can be made of any suitable material that will be compatible with the material of the casing.

It is to be understood that component parts used in making the plugs of this invention, whether integral with the casing stick or not, can be made of any suitable material capable of withstanding the pressure used to compact and form the plugs. It is thus apparent that each component part may be made of the same material or each may be made of a different material.

EXAMPLE I

Using the procedure outlined in FIGS. 1 through 9, a 0.711 mm. inch thick cylindrical stainless steel forming sleeve having an O.D. of 12.8 mm. was inserted within the bore of a hollow cellulose casing stick measuring 13.7 mm. I.D. and 22.8 mm. O.D. A highly polished 11.2 mm. diameter stainless steel pack rod, with a 4.7 mm. axial passage, was disposed within the bore of the forming sleeve. After a 12.7 cm. inch length of casing was deshirred, a highly polished 6.35 mm. diameter steel inverting rod was axially advanced into the forming sleeve for a distance of 20.32 cm. Upon removal of the inverting rod, a rigid flat surface was positioned against the fore end of the casing stick containing the inturned deshirred casing and then the pack rod was advanced to compact the inturned casing thereby forming a floating plug approximately 25.4 mm. long. Thereafter the sleeve, pack rod and rigid flat surface were removed leaving a casing stick having an integral floating end closure. The closed end casing stick was then placed in a conventional type hopper which fed the stick to a stuffing and linking machine as described in U.S. Pat. No. 3,115,668. The casing stick performed better than available commercial casing sticks in that the casing stick had a plug which was fabricated from a predetermined fixed amount of casing material which was adapted for easy and efficient stripping while being softer or less resilient thereby being admirably suited for cooperation with the sizing-linking means of the automatic stuffing machine.

EXAMPLE II

Using the procedure outlined in FIGS. 1 through 11, a 0.711 mm. thick cylindrical stainless steel forming sleeve, having an O.D. of 12.8 mm. was inserted within the bore of a cellulose hollow casing stick measuring 13.7 mm. I.D. and 22.8 mm. O.D. A highly polished 11.2 mm. diameter stainless steel pack rod, with a 4.7 mm. axial passage, was disposed within the bore of the forming sleeve. After a 15.24 cm. inch length of casing was deshirred and with the forming sleeve recessed about 12.7 mm. from the fore end of the casing stick, a highly polished 6.35 mm. diameter steel inverting rod was axially advanced into the forming sleeve for a distance of 15.24 cm. Upon removal of the inverting rod, a rigid flat surface was positioned against the fore end of the casing stick containing the inturned deshirred casing and then the pack rod was advanced to compact the inturned casing thereby forming a semi-floating plug having an anchored portion 12.7 mm. long and a floating portion 12.7 mm. long. Thereafter the sleeve, pack rod and rigid metal flat surface were removed leaving a casing stick having an integral semi-floating end closure. The closed end casing stick was then placed in a conventional type hopper which fed the stick to a stuffing and linking machine as described in U.S. Pat. No. 3,115,668. The casing stick performed better than available commercial casing sticks in that the casing stick had a plug which was fabricated from a predetermined fixed amount of casing material which was adapted for easy and efficient stripping while being softer and less resilient thereby being admirably suited for cooperation with the sizing-linking means of the automatic stuffing machine.

It is thus evident from the various embodiments shown in the drawings and from the examples that a free-floating plug is one that forms an integral part of the casing such that the plug is secured at the fore end of the internal wall of the casing by the portion of the deshirred casing that is common to the plug and the casing. A semi-floating plug is one that is or is not integral with the casing and which has a compressed portion of the plug tightly secured to the pleats at the fore end of the internal wall of the casing.

It is to be understood that other modifications and changes to the preferred embodiments of the invention herein shown and described can also be made by a person skilled in the art without departing from the spirit and scope of the invention.

What is claimed is:

1. A hollow shirred stick of tubular casing having an open end and a closed end, said closed end comprising a plug of compressed casing of which a first portion is secured to at least a portion of the fore end surface of the shirred stick with the remainder generally conforming to the bore of the shirred stick and extending within said bore so as to form an annular space between the entended portion of said plug and the internal wall of the shirred stick wherein the compressed casing of the plug is casing deshirred from the fore end of the shirred stick thereby resulting in said plug being a free floating plug integral with said shirred stick.

2. A hollow shirred stick of tubular casing having an open end and a closed end, said closed end comprising a plug of compressed casing of which a first portion is secured to at least a portion of the fore end surface of the shirred stick with the remainder generally conforming to the bore of the shirred stick and extending within said bore so as to form an annular space between the extended portion of said plug and the internal wall of the shirred stick wherein said plug is semi-floating plug in which the outer surface of said first portion of the compressed casing of said plug is firmly anchored to the pleats comprising the bore of the shirred stick at its outermost fore end and wherein the compressed casing of the semi-floating plug is casing deshirred from the fore end of the shirred stick thereby resulting in said plug being integral with said shirred stick.

3. A method of closing an end of a hollow shirred stick of tubular casing which comprises:
  a. placing a hollow cylindrical forming tube into the bore of a hollow shirred stick of tubular casing;
  b. inturning a portion of the casing at the fore end of the shirred stick into said forming tube;

c. placing a relatively fixed surface against the fore end of the shirred stick containing the inturned casing;
d. advancing a pack rod within the hollow cylindrical forming tube toward said fixed surface thereby compressing the inturned casing against said fixed surface to form a compressed plug of casing within the bore of the shirred stick; and
e. removing said forming tube from the bore of said shirred stick thereby forming an annular space between the extended portion of the plug and the internal wall of the shirred stick.

4. The method of claim 3 wherein said forming tube is placed flush mounted at the fore end of the shirred stick in step (a).

5. The method of claim 3 wherein said forming tube is placed such that it is recessed a fixed distance from the fore end of the shirred stick in step (a).

* * * * *